US012564542B2

(12) United States Patent
Lamprecht

(10) Patent No.: US 12,564,542 B2
(45) Date of Patent: Mar. 3, 2026

(54) MEDICAL FLUID CONTAINER

(71) Applicant: B. Braun Melsungen AG, Melsungen (DE)

(72) Inventor: Volker Lamprecht, Malsfeld (DE)

(73) Assignee: B. Braun Melsungen AG, Melsungen (DE)

( * ) Notice: Subject to any disclaimer, the term of this patent is extended or adjusted under 35 U.S.C. 154(b) by 0 days.

(21) Appl. No.: 18/697,456

(22) PCT Filed: Sep. 21, 2022

(86) PCT No.: PCT/EP2022/076234
§ 371 (c)(1),
(2) Date: Mar. 30, 2024

(87) PCT Pub. No.: WO2023/052218
PCT Pub. Date: Apr. 6, 2023

(65) Prior Publication Data
US 2024/0398664 A1 Dec. 5, 2024

(30) Foreign Application Priority Data

Oct. 1, 2021 (DE) ..................... 10 2021 125 561.9

(51) Int. Cl.
*A61J 1/14* (2023.01)
*B29C 49/76* (2006.01)
(Continued)

(52) U.S. Cl.
CPC .......... *A61J 1/1418* (2015.05); *B29C 49/761* (2022.05); *B29C 2049/5896* (2013.01); *B29L 2001/00* (2013.01); *B29L 2031/7158* (2013.01)

(58) Field of Classification Search
CPC ...... A61J 1/1418; B65D 1/023; B65D 1/0246
See application file for complete search history.

(56) References Cited

U.S. PATENT DOCUMENTS 3,224,038 A * 12/1965 Budescheim ........... B29C 49/76
                                                        425/535
4,007,243 A    2/1977 Rupert
                          (Continued)

FOREIGN PATENT DOCUMENTS

DE       202007009983 U1    12/2007
DE       102017009012 A1    3/2019
                          (Continued)

OTHER PUBLICATIONS

Search Report received in German Application No. 10 2021 125 561.9 dated Jun. 29, 2022, with translation, 11 pages.
(Continued)

*Primary Examiner* — Don M Anderson
(74) *Attorney, Agent, or Firm* — Christopher A. Rothe; CM Law

(57) ABSTRACT

A medical fluid container includes a container interior and a connecting piece that forms an inner channel. The container interior can be accessed from the outside via the connecting piece. The connecting piece has an outer thread on a connecting piece longitudinal section. The inner channel expands in a substantially conical manner in a region of the outer thread, starting from the container interior, to then preferably transition into a first cylindrical channel shape which extends to a free opening of the connecting piece. A method can be used for producing the medical fluid container from a container blank.

9 Claims, 2 Drawing Sheets

(51) Int. Cl.
    *B29C 49/58*        (2006.01)
    *B29L 1/00*         (2006.01)
    *B29L 31/00*       (2006.01)

(56)            References Cited

U.S. PATENT DOCUMENTS

| | | | |
|---|---|---|---|
| 4,065,535 A | 12/1977 | Legrand | |
| 2005/0271843 A1 | 12/2005 | Collette et al. | |
| 2012/0027966 A1* | 2/2012 | Barel | B29B 11/14 |
| | | | 428/34.1 |
| 2020/0276081 A1 | 9/2020 | Geser et al. | |
| 2024/0270433 A1* | 8/2024 | Dag | B65D 65/46 |
| 2024/0324751 A1* | 10/2024 | Ogawa | A61J 1/1418 |
| 2024/0358592 A1* | 10/2024 | Coon | A61J 1/065 |
| 2025/0017819 A1* | 1/2025 | Kellner | A61J 1/1425 |

FOREIGN PATENT DOCUMENTS

| | | | |
|---|---|---|---|
| JP | 04057732 A | 2/1992 | |
| JP | 2017043400 A | 3/2017 | |
| WO | 2007122324 A1 | 11/2007 | |
| WO | 2009053921 A1 | 4/2009 | |

OTHER PUBLICATIONS

Search Report received in International Application No. PCT/EP2022/076234 dated Apr. 6, 2023, with translation, 9 pages.
Written Opinion received in International Application No. PCT/EP2022/076234 dated Apr. 6, 2023, with translation, 20 pages.
Office Action received in European Application No. 22 793 139.1-1014 dated Aug. 18, 2025, with translation, 32 pages.

\* cited by examiner

MEDICAL FLUID CONTAINER

CROSS-REFERENCE TO RELATED APPLICATIONS

This application is the United States national stage entry of International Application No. PCT/EP2022/076234, filed on Sep. 21, 2022, and claims priority to German Application No. 10 2021 125 561.9, filed on Oct. 1, 2021. The contents of International Application No. PCT/EP2022/076234 and German Application No. 10 2021 125 561.9 are incorporated by reference herein in their entireties.

FIELD

The present disclosure relates to an, in particular reclosable, medical fluid container with a container connecting piece forming an inner channel and a method for forming a medical fluid container.

BACKGROUND

Medical fluid containers are used to store and transport medical fluids. Such medical fluid containers are often welded together in order to prevent the medical fluid from leaking. Alternatively, medical fluid containers may be configured as reclosable medical fluid containers. However, the production of such a reclosable medical fluid container is expensive and complex.

SUMMARY

Accordingly, the object of the present disclosure is to eliminate or at least reduce the disadvantages of such, in particular reclosable, medical fluid containers and to provide a reclosable medical fluid container which can be manufactured easily and inexpensively. A further aim of the disclosure is to provide a method for manufacturing such a reclosable medical fluid container.

Specifically, a medical fluid container is configured with a container connecting piece forming an inner channel and via which a container interior is accessible from the outside and which has an outer thread over a longitudinal portion of the connecting piece. The inner channel widens substantially conically within the longitudinal portion of the connecting piece having the outer thread (10), starting from a container interior, and then preferably merges into a first substantially cylindrical channel shape which extends up to the free aperture of the container connecting piece.

In other words, the medical fluid container is configured with the container connecting piece, which connects the container interior with an outer region surrounding the medical fluid container and which has an outer thread and can thus be closed via a screw cap. The inner channel of the container connecting piece has a substantially constant inner diameter in a portion facing away from the container interior. Starting from this portion with a constant inner diameter, following the portion with a constant inner diameter, the inner diameter decreases in the direction of the container interior, preferably linearly over a length of the container connecting piece. In particular, the inner diameter preferably decreases from approximately 28 mm to approximately 25 mm.

A medical fluid container configured in this way with a container connecting piece designed in this way enables a reduced wall thickness while at the same time reducing the risk of defects in the material of the container connecting piece. In this way, material and therefore costs can be saved. In addition, it is possible to manufacture such a medical fluid container in just one tool, which significantly reduces manufacturing and handling costs.

According to a further aspect of the disclosure, the medical fluid container is configured with the container connecting piece forming the inner channel and via which the container interior is accessible from the outside and which has the outer thread on the longitudinal portion of the connecting piece. The container connecting piece is formed exclusively by calibrating material insertion via a blow pin/blow-pin tip preferably having a conically tapering longitudinal portion of the outer circumference, and which presses a container blank in the region of the container connecting piece against/into a die having a longitudinal portion of the outer thread.

In other words, the container connecting piece of the medical fluid container is configured exclusively by mechanical pressure forming, in particular by mechanical thermoforming. Here, the conically tapering longitudinal portion of the outer circumference of the blow pin presses the container blank in the form of a (heated) extruded tube against a defined contour. By pressing the container blank between two forming tools made of steel (blow pin (tip) and die), the dimensional accuracy is significantly improved compared to blow molding without corresponding measures and a wall thickness can be reduced to a necessary minimum. Pressing additionally compacts the material of the container blank in the relevant region, which minimizes the risk of defects and sink marks. The container blank is preferably an extruded tube made of thermoplastic material.

Accordingly, the core of the invention is that the container connecting piece is configured via calibrating material insertion or via mechanical pressure forming with forming tools containing the blow pin or the blow-pin tip and the die.

According to a further aspect of the disclosure, the medical fluid container is configured with a method comprising the following method steps:

providing a substantially unprofiled cylindrical container blank;

inserting the blow pin into the substantially unprofiled cylindrical container blank;

Inserting the container blank into the die using the blow pin;

exclusively mechanical pressing of the container blank against the die in order to produce the container connecting piece using the blow pin, and pneumatic shaping of the container interior by blowing pressurized gas into the container blank using the blow pin.

In other words, the process for producing the medical fluid container can be divided into the following method steps:

placing the blow pin inside the (heated) tubular container blank;

placing of the tubular container blank in the die;

defined movement of the blow pin with the blow-pin tip relative to the die in the direction along a central fiber of the blow pin and compression molding of the tubular container blank between the blow pin or the blow-pin tip, in particular the conically tapering longitudinal portion of the outer circumference of the blow pin, and the die;

blowing pressurized gas, in particular compressed air, through a pressurized gas line, which runs through the blow pin, into the tubular container blank and thus forming the container interior below the container connecting piece by inflating the tubular container blank in the die, whereby the container blank inflates against a shaping wall of the die;

curing of the medical fluid container;

demolding the medical fluid container, and cutting off any protrusions and burrs, in particular a top and bottom slug.

In a further aspect, the inner channel of the container connecting piece of the medical fluid container may have a second cylindrical channel shape which, starting from the substantially conically widening region, extends in the direction toward the container interior.

In other words, the inner channel may contain three portions, wherein a conically widening portion in the form of the conically widening region is bounded at both ends by a cylindrical portion in each case.

In a further aspect, a bead geometry, preferably provided with a radius, may be configured between the container connecting piece and a container body of the medical fluid container.

In other words, in a container wall of the medical fluid container, the bead geometry may be configured in the form of a bulge of the container wall in a radial direction, with regard to a central fiber of the container connecting piece, away from the container interior. This bead geometry is arranged adjacent to the container connecting piece toward the container body. The bead geometry may preferably be configured with the radius. Such a bead geometry makes it possible to provide a tamper-evident ring, in particular a damage-free assembly of the tamper-evident ring. The tamper-evident ring ensures a reliable indication of whether the medical fluid container has been opened for the first time since it was closed (by the manufacturer). This is achieved in that the tamper-evident ring, which is configured in the screw cap in a form-fitting manner, gets at least partially separated from the screw cap when it is unscrewed. The bead geometry is preferably assigned to the container body and in particular is configured at the same time as the container body by blow molding.

In a further aspect, the radius may be oriented facing toward the container connecting piece.

In other words, the radius may be configured facing the container connecting piece at an edge of the bead geometry facing away from the central fiber of the container connecting piece. A further edge of the bead geometry facing away from the container connecting piece may be configured without a radius, in particular with a retention geometry. This ensures that the tamper-evident ring slides over the radius of the bead geometry during assembly without being damaged and enables automated assembly. On the other hand, the retention geometry may ensure that the tamper-evident ring is reliably separated from the screw cap when the screw cap is screwed off.

In a further aspect, a first diameter of the first cylindrical channel shape of the inner channel may be larger than a second diameter of the second cylindrical channel shape of the inner channel.

In other words, the first diameter of the first cylindrical channel shape of the inner channel, which corresponds to a diameter of an outlet opening/free aperture of the container connecting piece, may be larger than the second diameter of the second cylindrical channel shape of the inner channel, which is spaced from the first cylindrical channel shape by the conical region. In particular, the first diameter may be approximately 28 mm and the second diameter may be approximately 25 mm.

In a further aspect, a wall thickness of the container connecting piece may be less than or equal to 1.8 mm. Such a thin wall thickness may ensure that shrinkage and/or settling effects are reduced in particular during thermal sterilization of the medical fluid container. In other words, such a thin wall thickness may increase the dimensional stability and mechanical resistance to thermal influences in particular.

In a further aspect, the inner channel may widen conically at an angle of approximately 30°.

In other words, the region of the inner channel that widens conically starting from a container interior to the outlet opening may have a gradient of approximately 30°. Such an angle ensures a high compression of the material in the manufacturing process without negatively influencing the outflow characteristics of a fluid from the medical fluid container. In particular, an angle of approximately 30° ensures that the fluid can be poured out without gurgling during proper handling. A minimum diameter of approximately 25 mm of the inner channel is also required for pouring without gurgling.

In a further aspect, the container body of the medical fluid container may be formed by blow molding.

In other words, the container connecting piece and the container body may be configured in two different methods. While the container connecting piece is configured exclusively by calibrating material insertion, the container body is formed by blowing pressurized gas into the container body.

In a further aspect of the method described, the container blank may be mechanically pressed (in shape) against an accumulation edge of the die to produce the container connecting piece.

In other words, in the method of manufacturing the medical fluid container, the container connecting piece may be configured by mechanically pressing a portion of the container blank. The container connecting piece may be configured between a portion of the blow pin or blow-pin tip and a portion of the die configured as a die-side accumulation edge. The accumulation edge is a constriction of the medical fluid container, which is created by a protrusion or shoulder in the die. The accumulation edge prevents material from flowing out of the container blank in the direction of the container body. The container connecting piece is produced by pressing between the blow pin and the die and the material in the region of the container connecting piece can be compacted by the accumulation edge. This prevents the formation of defects, for example in the form of air pockets, and increases the strength of the container connecting piece.

The accumulation edge can be regarded as an imaginary spatial separation plane that separates the manufacturing methods of the calibrating material insertion for the container connecting piece and the blow molding for the container body.

DETAILED DESCRIPTION

Configuration examples of the present disclosure are described below on the basis of the associated Figures.

Figure 1:
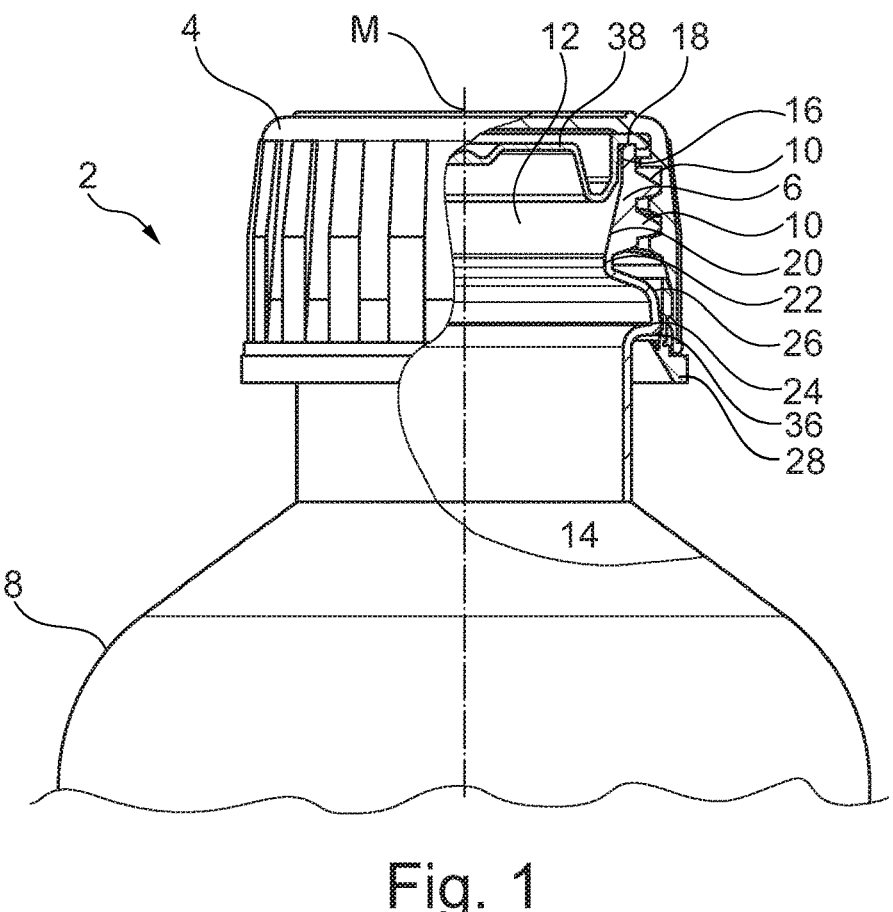
FIG. 1 is an illustration of an upper portion of a medical fluid container according to the invention, which is closed with a screw cap.

FIG. 1 shows an upper portion of a medical fluid container 2 according to the invention, which is closed with a screw cap 4. The medical fluid container 2 includes a container connecting piece 6 and a container body 8.

The design of the container body 8 is of secondary importance for the present disclosure, which is why a detailed illustration and elaborate description of the container body 8 is omitted. The container body 8 may have any geometric shape that is useful for use as a medical fluid container 2.

Figure 2:
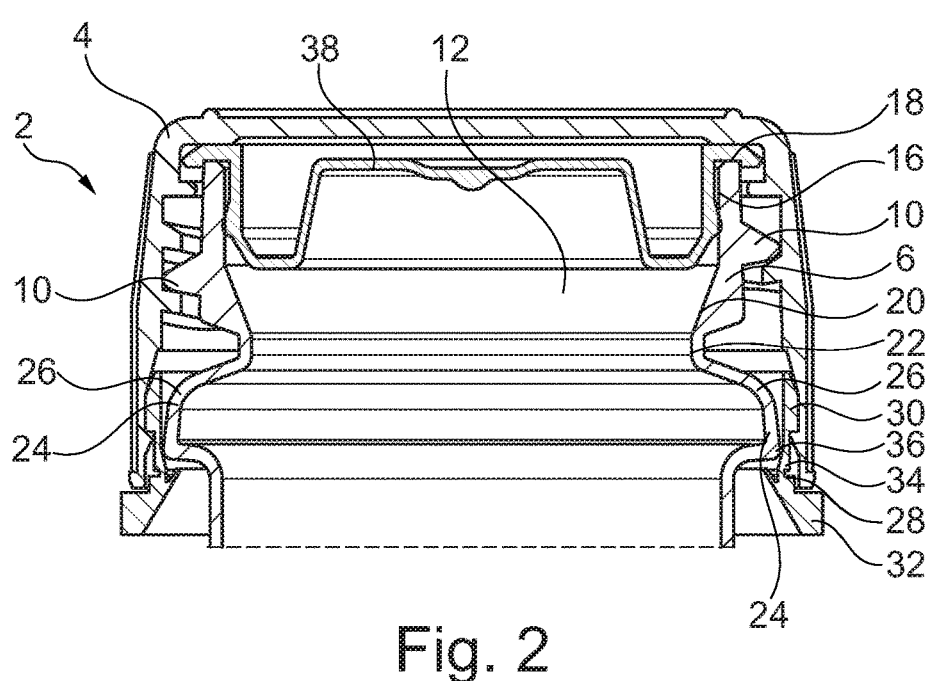
FIG. 2 is an enlarged sectional view of the upper portion of the medical fluid container according to the invention, which is closed with a screw cap.
Figure 3:
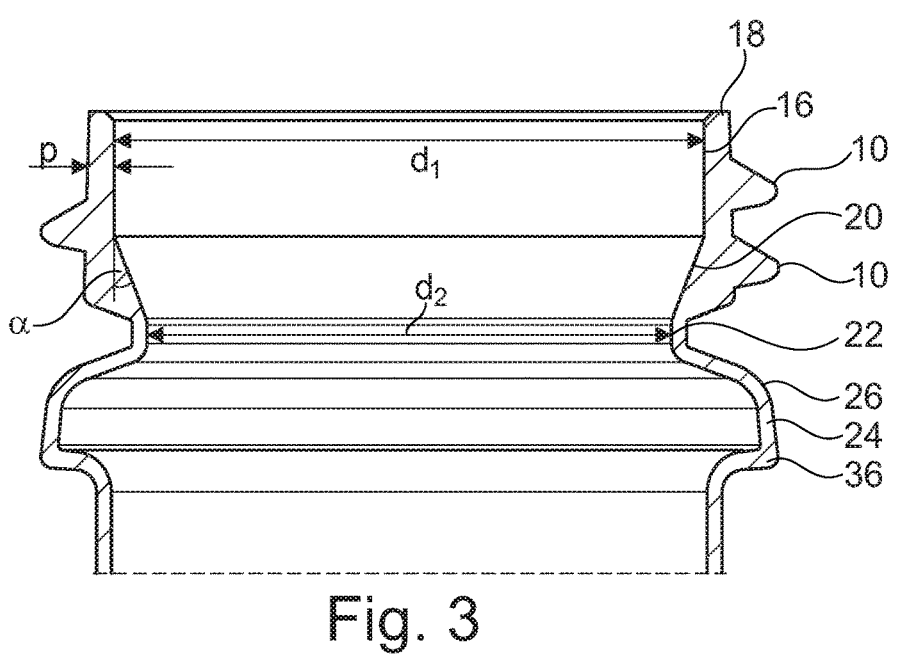
FIG. 3 is an enlarged sectional view of the upper portion of the medical fluid container according to the invention.

The container connecting piece 6 is explained in detail below with reference to FIG. 1, FIG. 2 and FIG. 3. The container connecting piece 6 has an outer thread 10 on an outer side or longitudinal portion of the connecting piece. The container connecting piece 6 forms an inner channel 12, which connects an environment surrounding the medical fluid container 2 with a container interior 14, which is configured primarily by the container body 8. The inner channel 12 contains three regions. A region of the first cylindrical channel shape 16, which directly adjoins an outlet opening 18 of the medical fluid container, a conical region 20, which adjoins the cylindrical channel shape 16 in the direction toward the container body 8, and a region of the second cylindrical channel shape 22, which adjoins the conical region 20 in the direction toward the container body 8. Here, the diameter of the region of the first cylindrical channel shape 16 is larger than the diameter of the second cylindrical channel shape 22. The difference in diameter is compensated by the conical region 20. In other words, the diameter of the inner channel 12 does not increase at any point starting from the outlet opening 18 to the region of the second cylindrical channel shape 22. The region of the second cylindrical channel shape 22 is also referred to as accumulation edge. A bead geometry 24 adjoins the second cylindrical channel shape 22. The bead geometry 24 is a bulge of the medical fluid container 2, which curves radially outward with respect to a center axis M of the medical fluid container 2. The bead geometry is configured with a radius 26 at an edge oriented in the direction of the outlet opening 18. The radius 26 enables non-destructive mounting of a tamper-evident ring 28. The tamper-evident ring 28 is an element that indicates opening of the medical fluid container 2 after initial closure. The tamper-evident ring 28 includes an upper ring 30, a lower ring 32, and predetermined breaking crosspieces 34, which connect the upper ring 30 to the lower ring 32. The upper ring 30 is connected to the screw cap 4 in a form-fitting manner. During assembly, the lower ring 32 slides over the radius 26 of the bead geometry 24. At an edge facing the container body 8, the bead geometry 24 is provided with a retention geometry 36. When the screw cap 4 is opened for the first time after assembly, the lower ring 32 catches on the retention geometry 36, the predetermined breaking crosspieces 34 break and the upper ring 30 and lower ring 32 are irreversibly separated.

The wall thickness p of the container connecting piece 6 does not exceed 1.8 mm at any point. The diameter d1 is approximately 28 mm and the diameter d2 is approximately 25 mm. The angle α is approximately 30°.

The screw cap further includes a sealing insert 38, which, however, is not considered in more detail in the context of the present disclosure.

Figure 4:
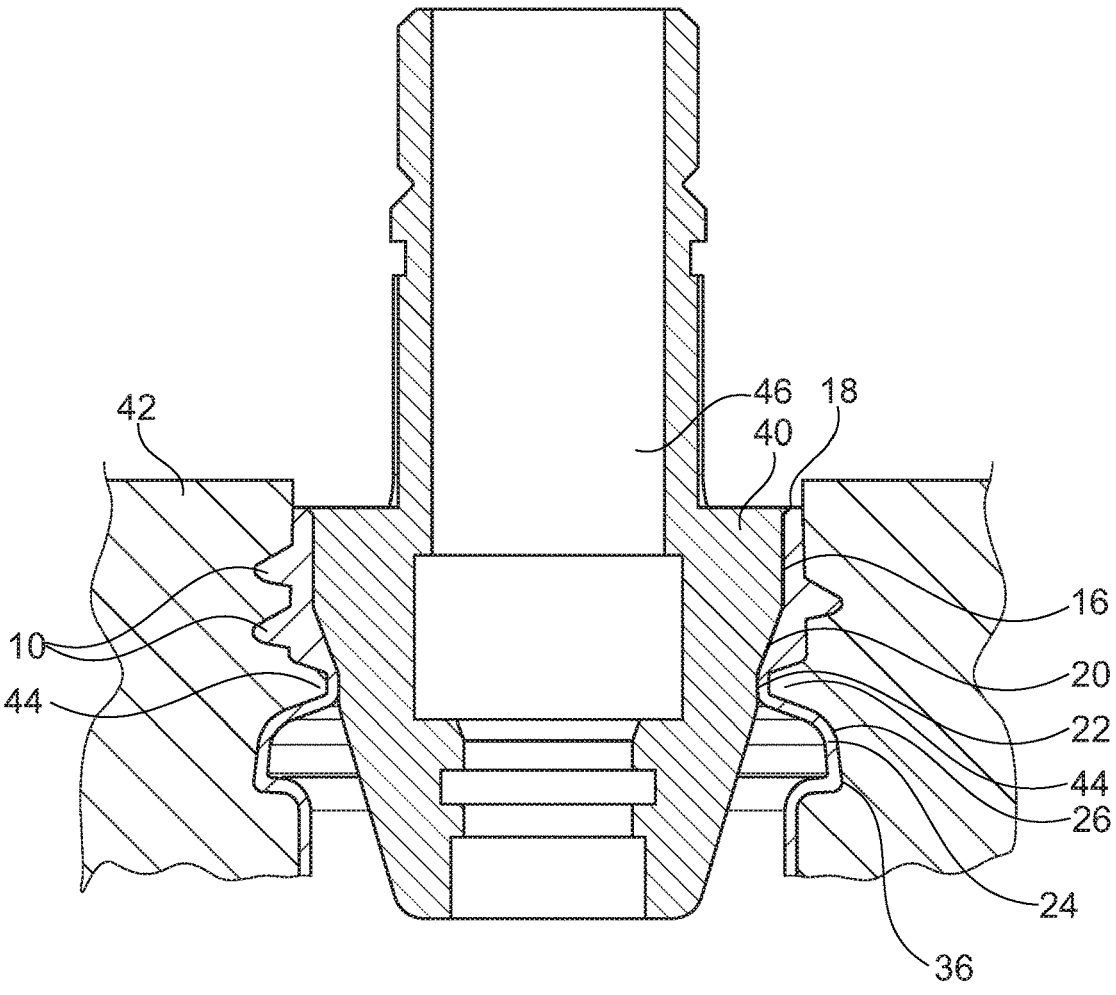
FIG. 4 is an enlarged sectional view of the upper portion of the medical fluid container according to the invention with a blow-pin tip and a die.

FIG. 4 shows the container connecting piece 6 and a blow-pin tip 40 as well as a die 42. The blow-pin tip 40 and the die 42 are used to form the medical fluid container 2. The medical fluid container 2 according to the invention is configured by a combination of two manufacturing methods, the sequence of which is explained below with reference to FIG. 4.

A blow pin with the blow-pin tip 40 is inserted into a substantially cylindrical container blank, preferably in the form of a tube. The container blank is preferably made of a thermoplastic. The container blank is heated and inserted into the die 42 via the blow pin with the blow-pin tip 40. The blow-pin tip 40 presses the container blank against the die 42, in particular against a die-side accumulation edge 44. This configures the container connecting piece 6, which is shown in FIG. 4 above the die-side accumulation edge 44. In other words, the container connecting piece 6 is configured by calibrating material insertion between the blow-pin tip 40 and the die 42. Through the conical region 20 at the blow-pin tip 40, the material of the container blank between the conical region and the die-side accumulation edge 44 can be additionally compacted. The die-side accumulation edge 44 also prevents the material from flowing off. The necessary pressure is generated by moving the blow pin with the blow-pin tip 40 against the die 42. In a further step, the container body 8 (see FIG. 1) is configured via blow molding. For this purpose, pressurized gas, preferably in the form of compressed air, is blown into the container blank via a pressurized gas line 46, which is located in the blow pin with the blow-pin tip 40. The container blank is blown against the mold wall of the die 42 and hardens or cools. This also configures the bead geometry 24 with the radius 26 and the retention geometry 36. The medical fluid container 2 is then demolded and deburred or excess material is removed. In other words, the medical fluid container 2 is demolded and deburred.

In summary, the present disclosure relates to a medical fluid container 2 with a container connecting piece 6 forming an inner channel 12 and via which a container interior 14 is accessible from the outside and which has an outer thread 10 on a longitudinal portion of the connecting piece and which extends over a thread portion in a longitudinal direction of the nozzle, wherein the inner channel 12 in the thread portion widens substantially conically starting from the container interior 14, 20, preferably in order to then merge into a first substantially cylindrical channel shape 16, which extends up to the free aperture 18 of the container connecting piece 6.

Furthermore, the present disclosure relates to a medical fluid container 2 preferably with the immediately preceding features, with a container connecting piece 6 forming an inner channel 12 and via which a container interior 14 is accessible from the outside and which has an outer thread 10 on a longitudinal portion of the connecting piece, wherein the container connecting piece 6 is formed exclusively by calibrating material insertion via a blow-pin tip 40, preferably having a conically tapering longitudinal portion of the outer circumference, and which presses a container blank in the region of the container connecting piece 6 against a die 42 having a longitudinal portion of the outer thread.

Finally, the present disclosure also relates to a method for forming a medical fluid container 2, preferably having the preceding features with the following method steps:

providing a substantially unprofiled cylindrical container blank;

inserting a blow pin into the substantially unprofiled cylindrical container blank;

inserting the container blank into a die 42 using the blow pin;

exclusively mechanical pressing of the container blank against the die 42 to produce a container connecting piece 6 using the blow pin, and pneumatic shaping of a container interior 14 by blowing pressurized gas into the container blank via the blow pin.

The invention claimed is:

1. A medical fluid container comprising:

a container body having a container interior;

a connecting piece adjacent to the container body along a center axis, the connecting piece forming an inner channel via which the container interior is accessible from outside the medical fluid container, the connecting piece having an outer thread over a longitudinal portion of the connecting piece, the inner channel having a first region having a first inner diameter, a second region spaced along the center axis from the first region and having a second inner diameter that is smaller than the first inner diameter, and a widening region that extends between the first region and the second region and widens substantially conically from the second inner diameter to the first inner diameter; and a bead geometry located between the second region and an end of the container body having a third inner diameter, wherein the bead geometry comprises a bulge that extends radially outwardly from the center axis and has a fourth inner diameter that is larger than the second inner diameter and larger than the third inner diameter.

2. The medical fluid container according to claim 1, wherein the first region of the inner channel has a first cylindrical channel shape that extends up to a free aperture of the connecting piece.

3. The medical fluid container according to claim 2, wherein the second region of the inner channel has a second cylindrical channel shape which, starting from the widening region, extends toward the container interior.

4. The medical fluid container according to claim 1, wherein the bead geometry is provided with a radius.

5. The medical fluid container according to claim 4, wherein the radius is oriented facing toward the connecting piece.

6. The medical fluid container according to claim 1, wherein a wall thickness of the connecting piece is less than or equal to 1.8 mm.

7. The medical fluid container according to claim 1, wherein the inner channel widens conically at an angle of approximately 30°.

8. The medical fluid container according to claim 1, wherein the container body is formed by blow molding.

9. The medical fluid container according to claim 1, wherein the bead geometry comprises a radiused portion adjacent to the second region of the inner channel and a retention geometry adjacent to the end of the container body, and the bulge is defined along the center axis between the radiused portion and the retention geometry.

* * * * *